July 16, 1957  LE ROY E. ANDERSON ET AL  2,799,518
HEATING CONDUIT CONNECTION WITH SPRING LATCH AND BAFFLE
Filed Aug. 6, 1954
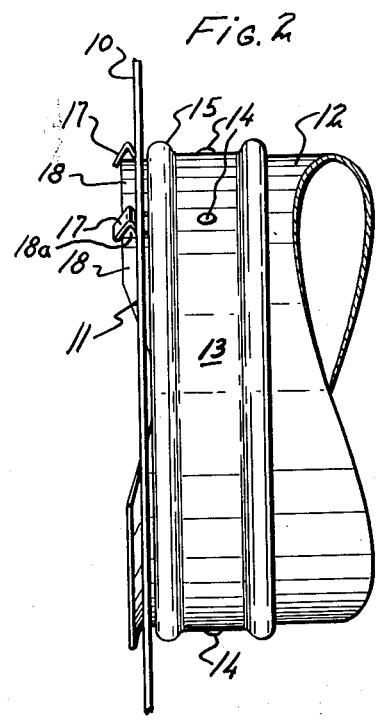
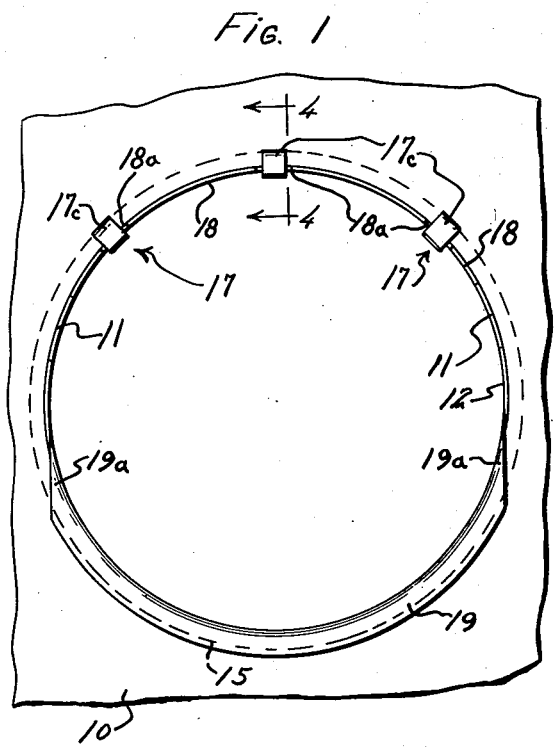
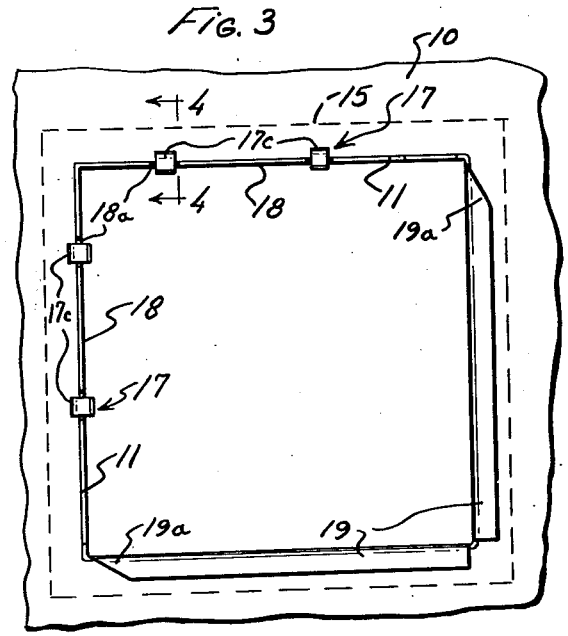
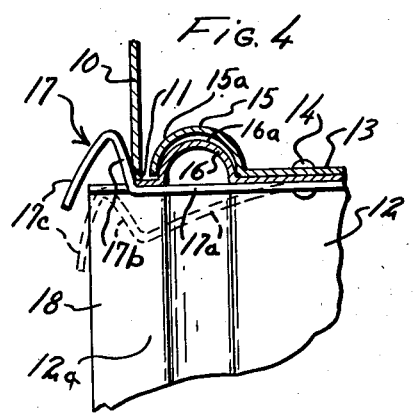
INVENTORS
LE ROY E. ANDERSON
H. F. ST. MARIE
BY Williamson, Williamson,
Schroeder & Adams
ATTORNEYS United States Patent Office 2,799,518
Patented July 16, 1957

2,799,518

HEATING CONDUIT CONNECTION WITH SPRING LATCH AND BAFFLE

Leroy E. Anderson and Hilaire F. St. Marie, Detroit Lakes, Minn., assignors to Tri-State Heating, Inc., Detroit Lakes, Minn., a corporation of Minnesota Application August 6, 1954, Serial No. 448,310

2 Claims. (Cl. 285—119)

This invention relates to heating conduits and more specifically relates to apparatus for connecting a tubular member to a panel having an opening therein.

In heating systems tubular conduits must often be connected to a plenum chamber through one of the panels of the chamber for the purpose of conducting heated air to or from such a chamber. Obviously the connection between the tubular conduit and the panel must make a relatively tight seal to restrict escaping of air through the connection. The common practice in making such a connection between a panel and a tubular conduit has been to provide several dovetail flanges on the end of the tubular conduit which are inserted through the opening in the panel of the plenum chamber and which must be bent outwardly therein to retain the conduit in the panel. This is accomplished by reaching through the tubular conduit, often at arms length, to bend the dovetailed flanges into panel-gripping position. The workman who makes such a connection must be skilled in order to obtain a relatively tight seal between the tubular conduit and the plenum chamber wall.

A general object of my invention is to provide a new and improved apparatus for connecting a tubular member such as an air conduit in a heating system to a panel having an opening therein, which apparatus is of simple and inexpensive construction and operation.

Another object of my invention is to provide novel apparatus for readily making a secure connection between a tubular member and a panel having an opening therein such as a wall of a plenum chamber.

Still another object of my invention is to provide improved apparatus which an unskilled workman can utilize in making a relatively tightly sealed connection without the aid of tools between a tubular member and a panel having an opening formed therein.

A further object of my invention is to provide apparatus which will make a secure connection between a tubular member and a panel having an opening therein when the tubular member is merely inserted into the opening of the panel, and which will permit rapid detaching of the tubular member from the panel.

A still further object of my invention is to provide a novel device for securing a tubular member within an opening of a panel member, the use of which will substantially reduce the amount of time required and the inconvenience experienced normally in making such a connection.

These and other objects and advantages of my invention will more fully appear from the following description made in connection with the accompanying drawings wherein like reference characters refer to the same parts throughout the several views and in which:

Fig. 1 is a front elevation view of my invention;

Fig. 2 is a side elevation view of my invention;

Fig. 3 is a front elevation of an alternative form of my invention; and

Fig. 4 is a detail view of a portion of my invention taken substantially at 4—4 of Fig. 1 and of Fig. 3.

The air ducts or conduits of a hot air heating system may include a plenum chamber (not shown), of which wall or panel 10 is a part. Panel 10, which may be constructed of a thin sheet material such as galvanized iron, has an opening 11 therein which may be of any suitable size and configuration such as round as shown in Fig. 1 or rectangular as shown in Fig. 3.

Also included in the air ducts of such a heating system may be a tubular member 12 to be attached to panel 10 and to communicate with the opening 11 thereof. The tubular member or conduit 12 may be constructed of a thin material, such as galvanized iron and may be of such external size and configuration to be inserted into the opening 11 of panel 10. Tubular member 12 has an open end portion 12a which may be fitted with an annular stiffening collar 13. Collar 13 is mounted inwardly in a direction longitudinally of tubular member 12 from the open end portion 12a thereof and may be secured thereto as by rivets 14. An annular bead 15 is provided on collar 13 adjacent to the open end portion 12a of tubular member 12 to provide a shoulder surface 15a at the outer edge of bead 15. Tubular member 12 is crimped into the interior of bead 15 of collar 13 to provide an annular bead 16 and shoulder surface 16a therein.

A plurality of radially inwardly shiftable resilient latching members 17 are mounted on tubular member 12 adjacent to the open end portion thereof. Each of the latching members include a flexible and resilient shank portion 17a which is connected to tubular member 12 by rivet 14 and which provides resilient means constantly urging latch member radially outwardly of tubular member 12. Latch member 17 also includes a panel-engaging portion 17b which extends radially outwardly from flexible shank 17a and from tubular member 12. The panel-engaging portion 17b of latch member 17 cooperates with the shoulder surface 15a of bead 15 to form a panel-receiving channel which positively engages the opening defining portions of panel 10.

The outer terminal portion of latch member 17 is inclined to provide a camming surface 17c which slopes in a direction radially inwardly of tubular member 12 and outwardly in a longitudinal direction of tubular member 12.

Heat baffles 18, constituting an extension portion of tubular member 12, are provided in the open end portion 12a of tubular member 12 and adjacent to the latching members 17. Baffles 18, which may be formed integrally of tubular member 12, extend outwardly of the open end portion 12a in a direction longitudinally of tubular member 12 and extend circumferentially around a section of the open end portion 12a of tubular member 12. Heat baffles 18 have opening 18a therein to permit latching members 17 to extend therethrough.

A radially out-turned lip or flange 19 is carried by tubular member 12 on the open end portion 12a thereof across from latch members 17 and heat baffles 18. Lip 19 is positioned adjacent to and outwardly of bead 15 of collar 13 in a direction longitudinally of tubular member 12 to cooperate with the shoulder surface 15a of bead 15 to form a panel-engaging channel for positively engaging the opening defining portion of panel 10. Lip 19 extends circumferentially along a section of the open end portion 12a of tubular member 12 and extends through an obtuse arc with respect to the center of conduit 12. The end portions 19a of flange 19 are tapered radially inwardly of tubular member 12 to permit flange 19 to be inserted through opening 11 of panel 10.

Construction of the connection shown in Fig. 3 is substantially identical to that shown in Figs. 1 and 2. Panel 10 has the opening 11 which is of rectangular shape. Tubular member 12 has a rectangular open end portion to correspond with opening 11 of panel 10. The stiffening collar 13 extends circumferentially around conduit 12 adjacent to the open end portion thereof, and has bead 15 thereon. Radially inwardly shiftable latch members 17 are secured to tubular member 12 and extend radially outwardly through the openings 18a provided in heat baffles 18. The radially out-turned flange 19 is positioned across the open end portion of conduit 12 from heat baffles 18 and latch members 17.

To attach the conduit 12 to panel 10, the out-turned lip 19 is inserted through opening 11 of panel 10 and the opening defining portion of panel 11 is guided into the channel defined by lip 19 and bead 15 of collar 13. Heat baffle 18 is then guided through opening 11 of panel 10, and the camming surfaces 17c of latch members 17 engage the opening defining portion of panel 10 to force latch members 17 radially inwardly of tubular member 12. The shoulder surface 15a of bead 15 will engage panel 11 and latch member 17 will spring radially outwardly of tubular member 12 to positively engage panel 11 and maintain the same in locked relation in the channels defined by latch members 17 and bead 15 of collar 13. Tubular member 12 will thereby be securely attached to panel 10. Heat baffles 18 and the outturned lip 19 will tightly engage the opening defining portions of panel 10 to form a relatively tight seal between conduit 12 and panel 10 to restrict the escape of air in the connection.

Tubular member 12 is readily and easily removed from panel 10 by merely shifting latch members 17 radially inwardly of tubular member 12 to release the opening-defining portions of panel 11. Conduit 12 may then be lifted out of opening 11 of panel 10.

When conduit 12 is attached to panel 10, heat baffles 18 and outturned lip 19 cooperate to restrict lateral shifting of conduit 12. If a lateral pressure is exerted on conduit 12 adjacent to out-turned lip 19, baffles 18 substantially preclude lateral movement of the conduit, and lip 19 and latch members 17 will remain in panel-securing relation.

It will be seen that I have provided new and improved apparatus of simple and inexpensive construction and operation for readily making a secure connection between a panel and a tubular conduit.

Another advantage of my improved apparatus is that even an unskilled workman can conveniently and easily make a secure and relatively tightly sealed connection between a panel and a tubular conduit in a short period of time and without the use of tools. Such a connection can be made through the use of my apparatus by merely inserting the conduit into the opening in the panel.

It will, of course, be understood that various changes may be made in the form, detail, arrangement and proportion of the parts without departing from the scope of my invention which consists of the matter described herein and set forth in the appended claims.

What is claimed is:

1. A heating conduit connection between a flow line and a panel of thin sheet material and having an opening formed therein, comprising a tubular member including an open end portion having a radially out-turned lip thereon and extending substantially halfway around the circumference of the tubular member, an outstanding shoulder surface formed externally on said tubular member adjacent to said lip and inwardly therefrom in a direction longitudinally of said tubular member, said shoulder surface cooperating with said lip to define a panel-engaging channel for positively engaging the opening-defining portions of the panel therebetween, said tubular member having a plurality of transversely outwardly projecting and inwardly shiftable camming latch members mounted across from said lip on said end portion of said tubular member and spaced longitudinally outwardly from the shoulder surface for cooperating with said surface in retaining the opening-defining portion of the panel therebetween, and a plurality of heat baffles carried by said tubular member and extending longitudinally thereof adjacent to and beyond said latch members and also extending circumferentially between the latch members and in substantially end-to-end relation with the lip, and said heat baffles restricting escape of heat between the panel and said tubular member and cooperating with said out-turned lip to restrict lateral movement of the conduit when connected to the panel.

2. An air duct connection between a plenum chamber and an air flow line having in combination a panel of thin sheet material and having an opening therein, a tubular member corresponding in exterior size and configuration to the opening in said panel, said tubular member having an open end portion and having a continuous external bead formed therearound adjacent to said end portion, a radially out-turned lip carried by the end portion of the tubular member and extending circumferentially substantially half way around the tubular member and cooperating with said bead to define a panel-receiving channel, said lip having end edges extending in converging directions outwardly of the tubular member to facilitate insertion of the lip through the panel opening, a plurality of radially inwardly-shiftable camming latch members mounted opposite said lip on the open end portion of said tubular member and projecting radially outwardly therefrom, each of said latch members cooperating with said bead to define a panel-receiving channel and to positively engage the opening-defining portion of said panel therein, and said tubular member having an extension portion extending longitudinally thereof adjacent to and beyond said latch members and engaging the opening-defining portion of said panel member in tight fitting relation, and said extension portion restricting the escape of air in the interconnection between said panel and said tubular member and cooperating with said lip in restricting lateral movement of the conduit secured to the panel and to thereby maintain said latch members and said lip in panel-securing relation.

References Cited in the file of this patent

UNITED STATES PATENTS

| | | |
|---|---|---|
| 249,103 | Schafer | Nov. 1, 1881 |
| 502,269 | Baldwin | Aug. 1, 1893 |
| 569,123 | Norton | Oct. 6, 1896 |
| 837,297 | Kennedy et al. | Dec. 25, 1906 |
| 2,466,504 | Stoyer | Apr. 5, 1949 |
| 2,590,797 | Siciliano | Mar. 25, 1952 |